US012522469B2

(12) United States Patent
Ge et al.

(10) Patent No.: US 12,522,469 B2
(45) Date of Patent: Jan. 13, 2026

(54) METHOD, DEVICE, AND EARLY WARNING SYSTEM FOR MONITORING ELEVATOR HEALTH STATE

(71) Applicant: CHANGSHU INSTITUTE OF TECHNOLOGY, Changshu (CN)

(72) Inventors: Yang Ge, Changshu (CN); Benlian Xu, Changshu (CN); Jiancong Qin, Changshu (CN); Lingyun Ma, Changshu (CN); Jianxin Ding, Changshu (CN); Fusheng Zhang, Changshu (CN); Jiaxin Ma, Changshu (CN); Yong Ren, Changshu (CN); Laipeng Yao, Changshu (CN)

(73) Assignee: CHANGSHU INSTITUTE OF TECHNOLOGY, Changsu (CN)

( * ) Notice: Subject to any disclaimer, the term of this patent is extended or adjusted under 35 U.S.C. 154(b) by 948 days.

(21) Appl. No.: 17/717,160

(22) Filed: Apr. 11, 2022

(65) Prior Publication Data

US 2022/0388810 A1 Dec. 8, 2022

(30) Foreign Application Priority Data

Jun. 7, 2021 (CN) ........................ 202110631782.9

(51) Int. Cl.
*B66B 5/00* (2006.01)
*B66B 5/02* (2006.01)

(52) U.S. Cl.
CPC .............. *B66B 5/0018* (2013.01); *B66B 5/02* (2013.01)

(58) Field of Classification Search
CPC ................................ B66B 5/0018; B66B 5/02
USPC ............................................................ 187/391
See application file for complete search history.

(56) References Cited

U.S. PATENT DOCUMENTS

2022/0002113 A1* 1/2022 De Piano .............. B66B 1/3492

FOREIGN PATENT DOCUMENTS

CN 108275529 A * 7/2018 ........... B66B 5/0018
CN 111268527 A * 6/2020 ........... B66B 5/0031
CN 210710213 U * 6/2020

* cited by examiner

*Primary Examiner* — Jianchun Qin
(74) *Attorney, Agent, or Firm* — Addison D. Ault

(57) ABSTRACT

An elevator health state online monitoring method includes: acquiring parameters such as a position, a three-axis acceleration, an inclination angle, and a noise of a car in a running state of an elevator, left and right brake temperatures of a traction machine, and an environment temperature. Parameter measuring devices are installed on a top of the car and at the brake side of the traction machine. The parameters are collected to a cloud database through a wireless network after being acquired, and a judgment result is given through background automatic analysis. The method is mainly used for monitoring whether key mechanical parts of the elevator are abnormal or not, including guide rail deformation, guide shoe abrasion, car sliding, brake abrasion, adhesion, and the like. This way the health state of the elevator can be automatically monitored, and early warning can be carried out in time when abnormity is found.

8 Claims, 4 Drawing Sheets

METHOD, DEVICE, AND EARLY WARNING SYSTEM FOR MONITORING ELEVATOR HEALTH STATE

CROSS REFERENCE TO THE RELATED APPLICATIONS

This application is based upon and claims priority to Chinese Patent Application No. 202110631782.9, filed on Jun. 7, 2021, the entire contents of which are incorporated herein by reference.

TECHNICAL FIELD

The present invention belongs to the technical field of elevator detection, in particular to an elevator health state monitoring method, a device and an early warning system.

BACKGROUND

At present, the production, installation, and use of elevators in China rank first in the world. The safety and reliability of elevators are related to the safety of passengers' lives and property, and elevator accidents have great social impact. With the development of technology, the electrical system of the elevator has a certain self-checking function. When the fault of the electrical system is detected, the elevator automatically stops running to ensure safety. However, for the mechanical system of elevator, there is still a lack of corresponding health self-inspection function. At present, it is still judged by manual regular on-site inspection, which inevitably leads to omissions and misjudgments, and the cost of manual inspection is high. If the elevator can automatically monitor its own health state and notify the maintenance personnel to carry out maintenance on site when any abnormality is found, the maintenance workload and cost can be greatly reduced. Therefore, devices and systems that can detect the health state of elevators in real time and warn abnormal state have become the key technologies to solve the problem of elevator on-demand maintenance.

SUMMARY

In view of the lack of self-checking function of elevator on the health state of mechanical system, the present invention provides a method for automatically monitoring the health state of an elevator, a device and an early warning system, the system can run independently only by supplying power without accessing any circuit system of the elevator, to monitor the health state of elevators in real time, and send out early warning in time when abnormal conditions are found. In addition, the monitoring system provided by the present invention can monitor a certain number of elevators in batches, thereby meeting the requirements of elevator maintenance companies, property management companies and elevator safety supervision departments.

In addition, according to the monitoring method provided by the present invention, judgment is made based on the historical data of the elevator itself, which does not need a large number of historical data of different samples as well as algorithms with high requirements on computing hardware such as neural networks and deep learning, thereby saving costs.

In the first aspect, the embodiment of the present invention provides an elevator health state on-line monitoring method, which includes:

acquiring a car position in a running state of the elevator, wherein the car position is measured according to a laser ranging sensor installed on a top of an elevator car, and the car position refers to a distance from the top of the car to a top surface of a hoistway;

acquiring an acceleration of the car in the running state of the elevator, wherein the acceleration of the car is measured according to a three-axis gyroscope sensor installed on the top of the elevator car, and the acceleration of the car includes acceleration in three directions: a running direction of the car, a direction of entering a car door and a vertical direction thereof;

acquiring an inclination of the car in the running state of the elevator, wherein the inclination of the car is measured according to an inclination sensor installed on the top of the elevator car, the inclination of the car refers to the inclination of the top surface of the car to a horizontal plane, and includes inclinations in two directions: the direction of entering the car door and the vertical direction thereof;

acquiring a noise value in the running state of the elevator car, wherein the noise value is measured according to a noise sensor installed on the top of the elevator car; and the noise value refers to a sound decibel number of the car running in a hoistway of the elevator, and is mainly from friction noise of guide rails and guide shoes (guide wheels) of the elevator and some resonance noise;

acquiring a brake temperature of a traction machine in the running state of the elevator, wherein the brake temperature is measured according to a temperature sensor installed on a brake side of the traction machine of the elevator, and the brake temperature refers to a measured value of the temperature sensor attached to an outer side of a brake shoe and includes temperatures of left and right brake shoes, for convenience of comparison, an environmental temperature needs to be measured, and temperatures at two brake shoes and the environment temperature are measured using three identical sensors.

In the second aspect, the embodiment of the present invention provides an elevator health state monitoring device, and the device includes:

a distance measurement module for monitoring a position of an elevator car, installed on a top of the elevator car, mainly composed of laser sensors, and measuring a value of a distance between a top of the elevator car and a top surface of a hoistway;

an acceleration measurement module for measuring an acceleration in a running process of the car, installed on the top of the car, mainly composed of three-axis gyroscopes, and measuring acceleration values of an elevator car moving direction, a car door direction and a vertical direction thereof;

an inclination measurement module for measuring an inclination in the running process of the car, installed on the top of the car, mainly composed of inclination sensors, and measuring an angle between the elevator door direction and the horizontal plane, and an angle between the vertical direction thereof and the horizontal plane;

a noise measurement module for measuring a noise in the running process of the elevator car in the hoistway, installed on the top of the car, mainly composed of noise sensors, and measuring a noise decibel value in the running process of the elevator car; and a temperature measurement module for measuring a brake temperature and an environment temperature of a traction machine in a running state of the elevator.

In the third aspect, the embodiment of the present invention provides an elevator health state monitoring and early warning system, which includes: a data processing module, a communication module, a cloud database, a background analysis program and a client;

the data processing module is used for preprocessing data collected by the distance measurement module, the acceleration measurement module, the noise measurement module and the temperature measurement module, converting the data into a required format, and judging whether it is necessary to upload the data to the cloud database according to set conditions;

the communication module is used for connecting the distance measurement module, the acceleration measurement module and the temperature measurement module, and collecting data and sending the data to the cloud database through a 4G network;

the cloud database is used for storing historical health state data of a governed elevator, including elevator number, name, address, installation time, maintenance record and historical data of car position, car acceleration, car inclination, noise and brake temperature;

the background analysis program is used for analyzing the data stored in the cloud database, judging whether the elevator has abnormality according to a set threshold and conditions, and sending an early warning message to the client if the abnormality is found; and the client is used for inquiring history information of the elevator according to the set conditions, and is capable of displaying the history health state of the elevator in a graphic manner, in addition, the client also has a function of receiving the early warning message sent by the background analysis program.

The elevator health state monitoring method, the device and the early warning system provided by the embodiment of the present invention run independently of an elevator control system, do not have any communication with the elevator control system, and determine a running state of the elevator through the laser ranging sensor, conform to the national standard, and ensure the safety of the elevator control system.

BRIEF DESCRIPTION OF THE DRAWINGS

In order to more clearly explain the technical solution of the embodiment of the present invention, the drawings required in the embodiment or the technical description are briefly introduced below.

DETAILED DESCRIPTION OF THE EMBODIMENTS

The present invention is further illustrated below with reference to the accompanying drawings.

Figure 1:
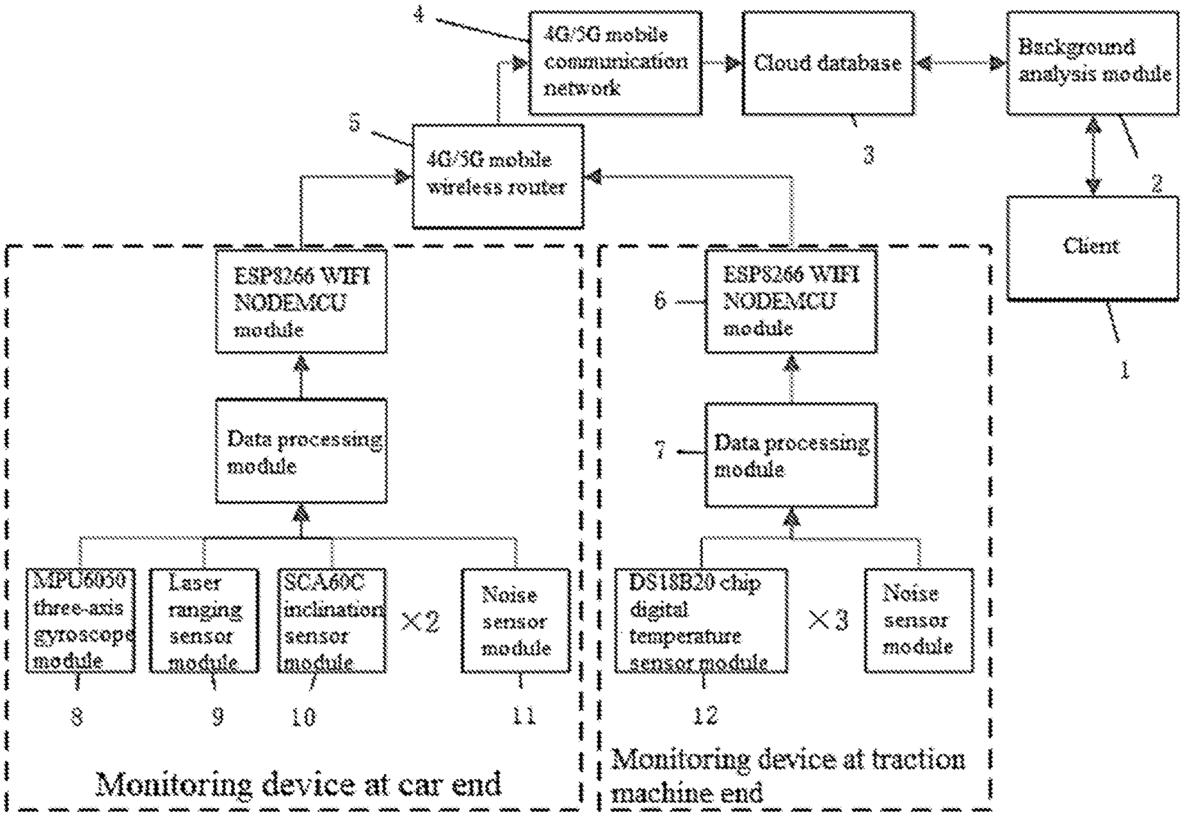
FIG. 1 is a schematic diagram of an elevator health state monitoring method, a device and an early warning system provided by the present invention.

The embodiment of the present invention provides an elevator health state monitoring method, a device and a system. As shown in FIG. 1, FIG. 1 illustrates an elevator state monitoring method, device and system according to an embodiment of the present invention, which includes: a client 1, a background analysis module 2, a cloud database 3, a 4G/5G mobile communication network 4, a 4G/5G mobile wireless router 5, an ESP8266 WIFI NODEMCU module 6, a data processing module 7, an MPU6050 three-axis gyroscope module 8, a laser ranging sensor module 9, an SCA60C inclination sensor module 10, a noise sensor module 11, a DS18B20 chip digital temperature sensor module 12, wherein there are several clients 1 and background analysis modules 2, and one set of monitoring device is installed in each elevator, which includes one 4G/5G mobile wireless router, two ESP8266 WIFI NODEMCU modules, two data processing modules, one MPU6050 three-axis gyroscope module, one laser ranging sensor module, two SCA60C inclination sensor modules, one noise sensor module and three DS18B20 chip digital temperature sensor modules.

Figure 2:
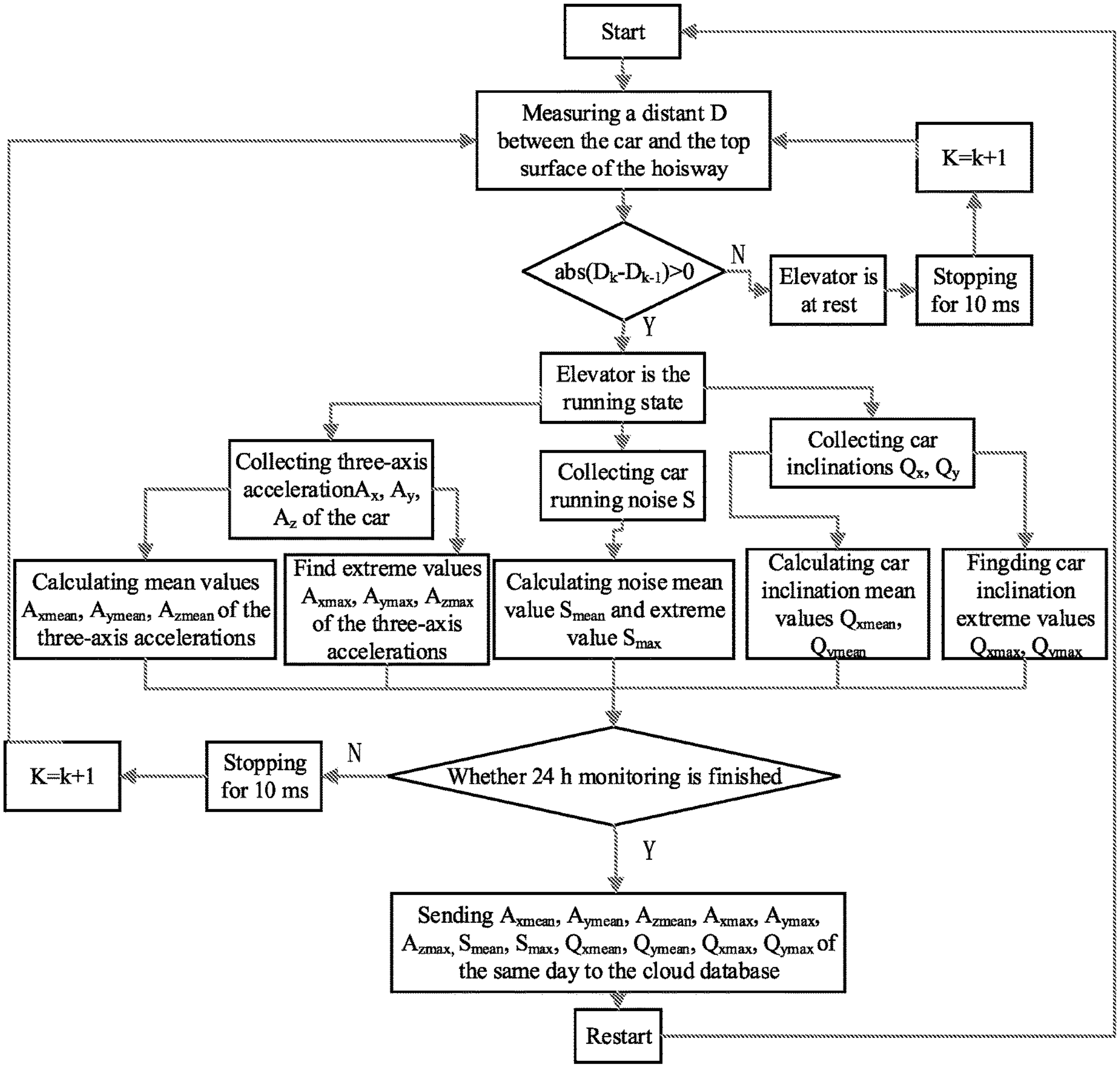
FIG. 2 is a schematic diagram of an acceleration and an inclination monitoring method of an elevator car provided by the present invention.

FIG. 2 shows a monitoring flow of the monitoring device at the elevator car end provided by the present invention, which includes the following steps:

step 1, judging whether the elevator is in a running state, measuring a distance between a top of the car and a top surface of a hoistway by a laser ranging sensor every 10 ms, if adjacent two measured values are equal, indicating that the elevator is in a stopped state, continuing to measure the distance between the car and the top of the hoistway, if the adjacent two measured values are different, indicating that the elevator is in the running state, and turning to step 2;

step 2, collecting elevator health state parameters, measuring instantaneous acceleration values in three directions of the car by a three-axis gyroscope, collecting sound decibel values of the car running in the hoistway by a noise sensor, and collecting an inclination of the car in two horizontal directions and a horizontal plane in the running process by an inclination sensor, wherein the parameters collected in this step are collected once every 10 ms, and an average value and a maximum value are calculated immediately after collections; and step 3, judging whether a monitoring task of the day is completed, judging whether the monitoring has been lasted for 24 hours through a timer, if it doesn't reach 24 hours, pausing for 10 ms to continue the next parameter collection, turning to step 1, if it reaches 24 hours, uploading average value and maximum value of car running triaxial acceleration, average value and maximum value of car running noise and average value and maximum value of car running inclination collected on the same day to the cloud database through the communication module, after uploading, restarting the monitoring device to monitor for a new day.

Figure 3:
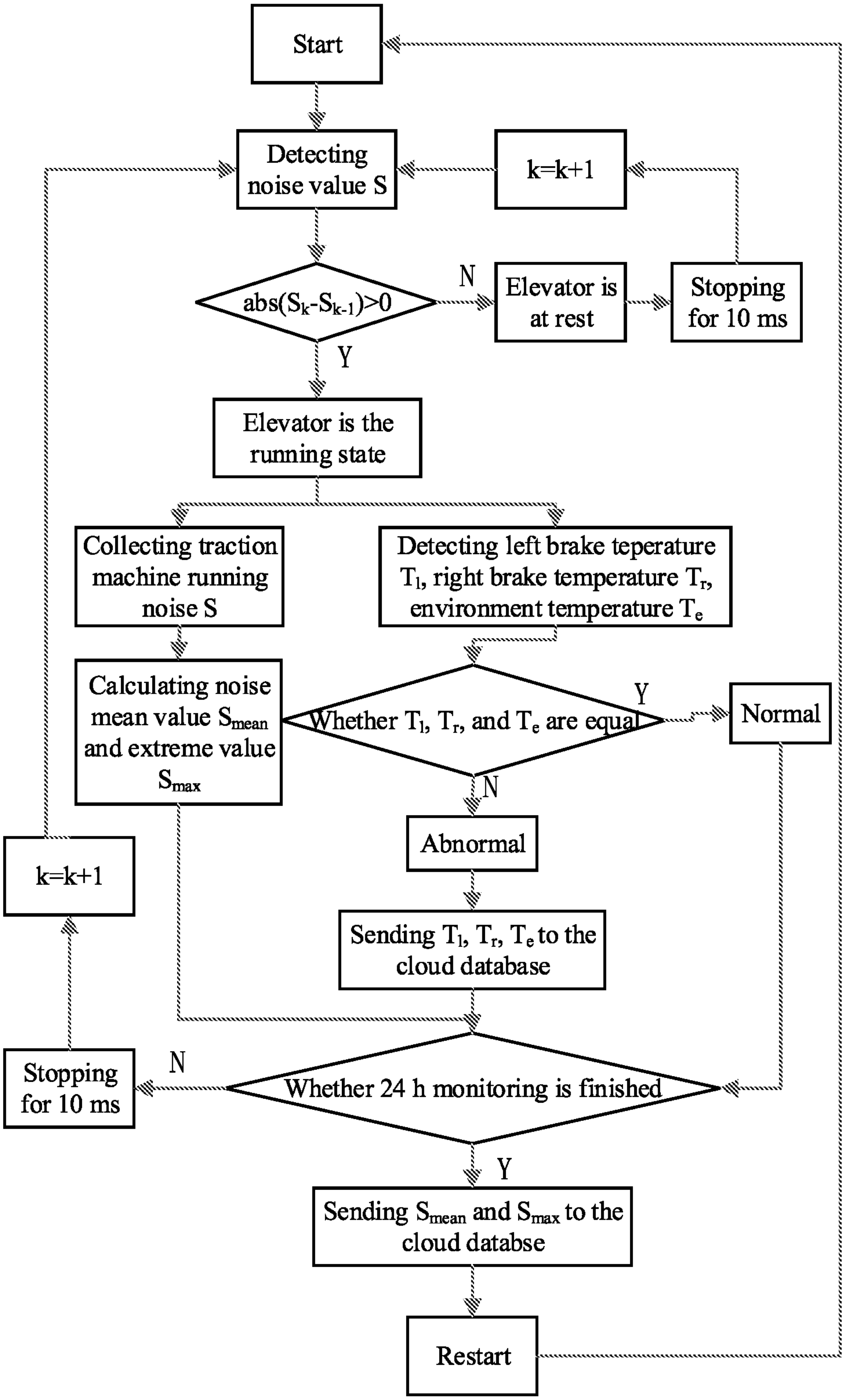
FIG. 3 is a schematic diagram of a brake health state monitoring method of an electric traction machine provided by the present invention.

FIG. 3 shows a monitoring flow of the monitoring device at the traction machine end provided by the present invention, which includes the following steps:

step 1, judging whether the elevator is in a running state, measuring sound decibel values at the traction machine end through a noise sensor every 10 ms, if adjacent two measured values are equal, indicating that the traction machine is in a stopped state, continuously measuring the sound decibel value, and if the two measured values are not equal, indicating that the traction machine is in a running state, and turning to step 2;

step 2, collecting a brake shoe temperature of the traction machine and an environment temperature, measuring temperatures of two brake shoes by a chip temperature sensor installed on an outer side of the brake shoe, respectively, at the same time, measuring the environment temperature by a temperature sensor installed beside the traction machine, and determining whether the three temperatures are all equal in real time, if they are equal, indicating that the brake is normal, and if they are not equal, indicating that the brake is abnormal, then uploading the three temperature value to the cloud database through the communication module; and step 3, judging whether a monitoring task of the day is completed, judging whether the monitoring has been lasted for 24 hours through a timer, if it doesn't reach 24 hours, pausing for 10 ms to continue the next parameter collection, turning to step 1, if it reaches 24 hours, uploading average value and maximum value of traction machine running noise collected on the same day through the communication module, after uploading, restarting the monitoring device to monitor for a new day.

Figure 4:
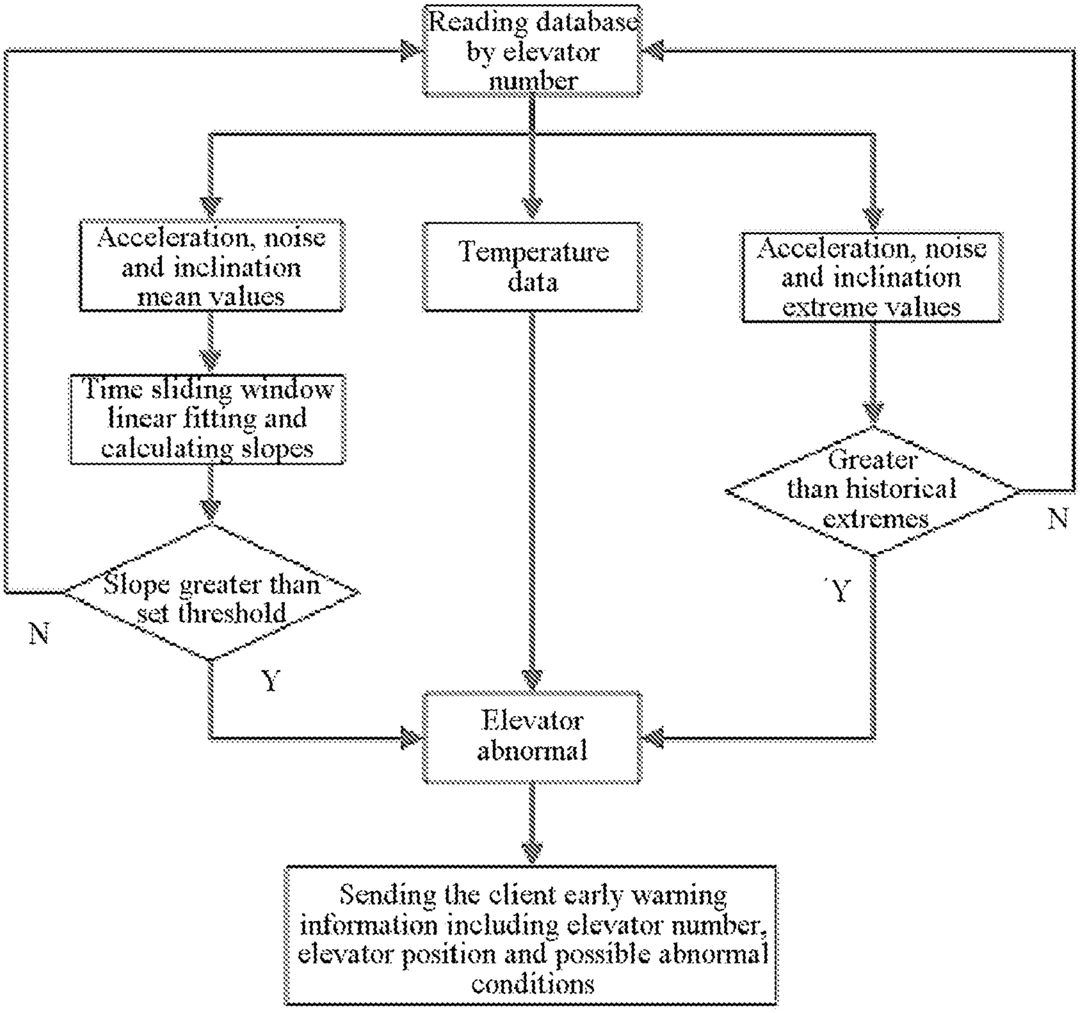
FIG. 4 is a basic schematic diagram of an elevator health state background analysis module provided by the present invention.

FIG. 4 shows a background analysis and early warning system of the elevator health state monitoring provided by the present invention, which includes the following steps:

step 1, reading data of the nearest time period of the cloud database according to a set time period, and classifying the data according to the elevator number and the sensor category; and step 2, for mean value data, performing a linear fitting according to the set time period, and calculating slopes of various data, then comparing the slopes with set slopes, and if a threshold value is exceeded, sending early warning information to the client; for extreme value data, directly judging whether it exceeds the corresponding set threshold, and if it exceeds, sending early warning information to the client; for temperature data from the traction machine end, once new data is uploaded, indicating that the traction machine is abnormal, and at this time, sending early warning information to the client, wherein the early warning information in this step includes elevator number, elevator position, possible abnormality and abnormal discovery time; and if no abnormality is found, turning to step 1.

It is emphasized that, due to the difference of each elevator model, manufacturer, operating environment and other factors, the parameters collected during operation are also quite different, in addition, due to the difficulty of data calibration, it is difficult to collect sample data of life cycle parameters of each elevator, this is poor universality for advanced algorithms such as deep learning or transfer learning, the concept proposed by the present invention is to use the historical data of each elevator itself to judge the possible abnormal problems according to the change trend of each parameter, without migrating training from other elevator data or experimental data, thereby reducing the hardware cost of the monitoring system and improving the response speed of the monitoring system.

Furthermore, according to the degradation mechanism of elevator mechanical system parts, there will be a gradual deterioration process before the failure of mechanical parts, and as long as an abnormality can be found in the degradation process, the failure can be predicted in advance. Therefore, the elevator health state monitoring method provided by the present invention monitors the elevator in days, that is to say, all of the processed monitoring parameters of the elevator are uploaded only once a day, which can avoid the transmission of redundant data, reduce the data flow, reduce the occupied space of the cloud database, improve the speed of background analysis, and ensure the timely discovery of abnormal situations. In addition, all the devices provided by the present invention are restarted regularly every day at a set time, which can avoid the jamming problem caused by network, crash, and other reasons.

As mentioned above, it is only a preferred specific embodiment of the present invention, but the scope of protection of the present invention is not limited thereto. Any equivalent alternation and change made by those familiar with the technical field according to the technical solution and the inventive concept of the present invention, within the technical scope disclosed by the present invention, should be covered within the scope of protection of the present invention.

What is claimed is:

1. An elevator health state on-line monitoring method, comprising:

1) Acquiring a car position in a running state of an elevator, wherein the car position is measured according to a laser ranging sensor installed on a top of an elevator car;
2) Acquiring an acceleration of the elevator car in the running state of the elevator, wherein the acceleration of the elevator car is measured according to a three-axis gyroscope sensor installed on the top of the elevator car;
3) Acquiring an inclination of the elevator car in the running state of the elevator, wherein the inclination of the elevator car is measured according to an inclination sensor installed on the top of the elevator car;
4) Acquiring a noise value in a running state of the elevator car, wherein the noise value is measured according to a noise sensor installed on the top of the elevator car; and
5) Acquiring a brake temperature of a traction machine and an environmental temperature in the running state of the elevator, wherein the brake temperature is measured according to a temperature sensor installed on a brake side of the traction machine of the elevator, and the environmental temperature is measured according to a temperature sensor installed beside the traction machine.

2. The elevator health state on-line monitoring method according to claim 1, wherein the car position refers to a distance from the top of the elevator car to a top surface of a hoistway in the elevator.

3. The elevator health state on-line monitoring method according to claim 1, wherein the acceleration of the elevator car comprises accelerations in three directions: a running direction of the elevator car, a direction of the elevator car entering a car door, and a vertical direction of the elevator car.

4. The elevator health state on-line monitoring method according to claim 1, wherein the inclination of the elevator car refers to an inclination of a top surface of the elevator car to a horizontal plane, and the inclination of the elevator car comprises inclinations in two directions: a direction of the elevator car entering a car door and a vertical direction of the elevator car.

5. The elevator health state on-line monitoring method according to claim 1, wherein the noise value refers to a sound decibel number of the elevator car running in a hoistway of the elevator, and is from friction noise of guide rails and guide shoes of the elevator and resonance noise.

6. The elevator health state on-line monitoring method according to claim 1, wherein the brake temperature refers to a measured value of the temperature sensor attached to an outer side of a brake shoe of the elevator, and the brake temperature includes temperatures of left and right brake shoes;

and the temperatures at the left and right brake shoes and the environment temperature are measured using three identical sensors.

7. An elevator health state monitoring device, comprising:

1) A distance measurement module for monitoring a position of an elevator car, wherein the distance measurement module is installed on a top of the elevator car and composed of laser sensors, and the distance measurement module measures a value of a distance between a top of the elevator car and a top surface of a hoistway of an elevator;

2) An acceleration measurement module for measuring an acceleration in a running state of the elevator car, wherein the acceleration measurement module is installed on the top of the elevator car and composed of three-axis gyroscopes, and the acceleration measurement module measures acceleration values of a moving direction of the elevator car, an elevator car door direction, and a vertical direction of the elevator car;

3) An inclination measurement module for measuring an inclination in the running state of the elevator car, wherein the inclination measurement module is installed on the top of the elevator car and composed of inclination sensors, and the inclination measurement module measures an angle between the elevator car door direction and a horizontal plane, and an angle between the vertical direction of the elevator car and the horizontal plane;

4) A noise measurement module for measuring a noise value in the running state of the elevator car in the hoistway, wherein the noise measurement module is installed on the top of the elevator car and composed of noise sensors, and the noise measurement module measures a sound decibel value of the elevator car running in the hoistway; and 5) a temperature measurement module for measuring a brake temperature and an environment temperature of a traction machine in the running state of the elevator car.

8. An elevator health state monitoring and early warning system, comprising: a data processing module, a communication module, a cloud database, a background analysis program, and a client;

wherein the data processing module is configured to preprocess data collected by the distance measurement module, the acceleration measurement module, the noise measurement module, and the temperature measurement module according to claim 7, convert the data into a required format, and judge whether it is necessary to upload the data to the cloud database according to a first set of conditions;

the communication module is configured to connect the distance measurement module, the acceleration measurement module, and the temperature measurement module, and collect the data and send the data to the cloud database through a 4G/5G network;

the cloud database is configured to store historical health state data of an elevator governed by the elevator health state monitoring and early warning system, wherein the historical health state data comprise elevator number, name, address, installation time, maintenance record, and historical data of a car position, a car acceleration, a car inclination, a noise value, and a brake temperature;

the background analysis program is configured to analyze the data stored in the cloud database, judge whether the elevator has abnormality according to a set threshold and a second set of conditions, and send an early warning message to the client if the abnormality is found; and the client is configured to inquire history information of the elevator according to the second set of conditions, the client is configured to display the historical health state data of the elevator in a graphic manner, and the client has a function of receiving the early warning message sent by the background analysis program.

* * * * *